E. Osgood.
Cotton Gin.
No. 1,628. Reissued Mar. 8, 1864.
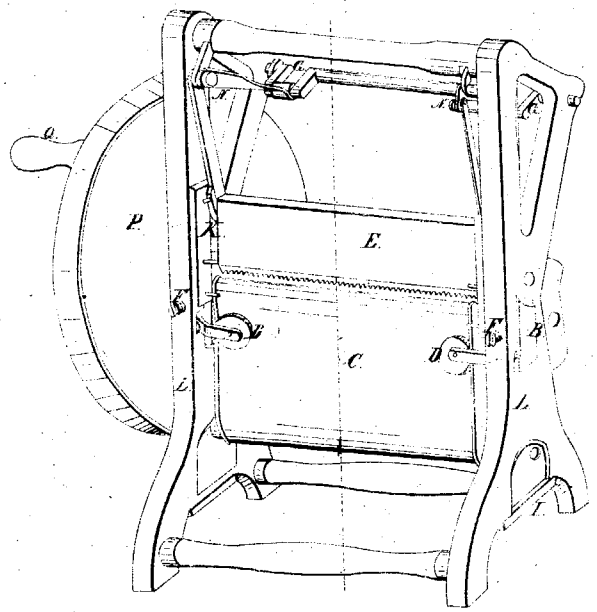
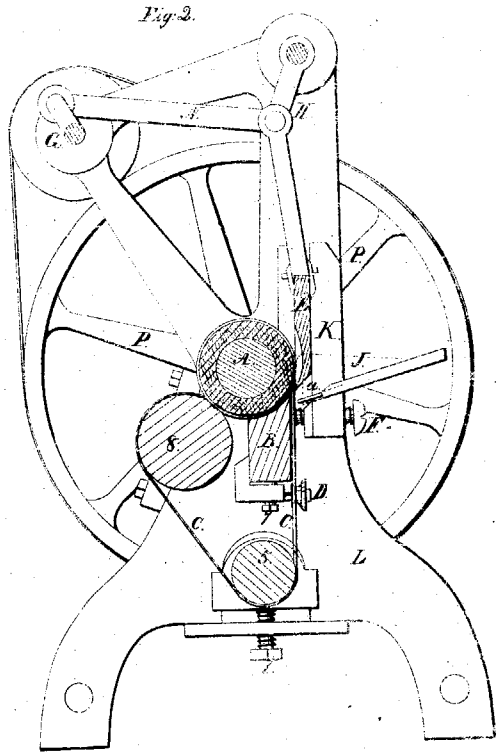
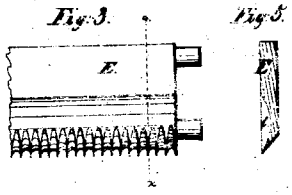
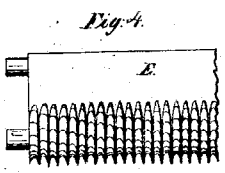
Witnesses:
Jno. J. Wightman
W. L. Bennem
Inventor:
Enoch Osgood
by his Attorney
E. S. Renwick

UNITED STATES PATENT OFFICE.

ENOCH OSGOOD, OF NEW YORK, N. Y.

IMPROVEMENT IN COTTON-GINS.

Specification forming part of Letters Patent No. 41,046, dated December 22, 1863; Reissue No. 1,628, dated March 8, 1864.

*To all whom it may concern:*

Be it known that I, ENOCH OSGOOD, of the city, county, and State of New York, have invented certain new and useful Improvements in Machines for Ginning Cotton and for other Purposes; and I do hereby declare that the following is a full, clear, and exact description of my invention, reference being had to the accompanying drawings, in which—

Figure 1 represents a perspective view of a machine constructed according to my invention. Fig. 2 represents a transverse section of the same. Fig. 3 represents a view of the inner side of a portion of the cleaning-plate, with the teeth of one of the forms used by me, having the teeth hollowed out. Fig. 4 represents a view of the inner side of a portion of the cleaning-plate with the teeth of another of the forms used by me, and Fig. 5 represents a transverse section of the cleaning-plate at the line *x x* of Fig. 3.

The object of my invention is to gin cotton, or, in other words, to separate the seeds from the fiber, and for similar purposes; and it relates to that class of gins which are called "roller-gins."

The special object of the first and second parts of the invention is to move the fiber through the machine, and the first part consists of the combination of an elastic roller with a concave bar, whose concave side is adapted to the curvature of the elastic roller, so that the fibrous material is gripped between the two for a considerable portion of the surface of the elastic roller.

The second part of the invention consists of the combination of the electric roller and concave bar, with an endless apron encircling the concave bar, so that the fibrous material, while maintained in contact with a considerable portion of the moving surface of the elastic roller, is acted upon by two moving surfaces, one at each of its sides.

The third part of the invention consists of the combination and arrangement of the elastic roller, concave bar, and a reciprocating cleansing-plate operating in such manner that the elastic roller and concave bar draw the fiber through the machine while the cleaning-plate ejects the seeds.

The fourth part of the invention consists of a reciprocating cleaning-plate, constructed with its inner face grooved or fluted transversely to its lower edge, so as to form spaces for the free passage of the fiber.

The fifth part of the invention consists of a reciprocating cleaning-plate, constructed with teeth formed by grooving its inner face and beveling off its lower edge, so that when the said teeth are caused to move close to the plane face of the concave bar, or the equivalent thereof, the teeth will pass through the fiber and between the seeds and the said face without tending to pierce the seeds, while the fiber is drawn through the grooves between the teeth.

The various moving parts of the machine are supported by a frame composed of two standards, L L, connected by cross-bars. The standards contain the bearings or boxes in which the journals of the elastic roller A revolve, and also the bearings of such shafts as are required to impart motion to the various acting members of the machines. The elastic roller A may be two and one-half inches (more or less) in diameter and eighteen inches long between its journals. Its barrel is horizontal, and extends between the two end standards of the frame, and one of its journals is extended through and beyond the end standard of the frame to receive a wheel, P, fitted with a crank, Q, to which the power is applied to give the machine motion. The elastic roller A is formed with a core of metal, which also forms its journals. This core is surrounded with an elastic coat of vulcanized india-rubber, similar to that used for steam-packing, or of other suitable substance that will produce the same yielding effect, and around this is cemented a jacket of leather or any other substance that will prevent the rubber from becoming sticky by the friction to which it is subjected; or the rubber may be covered with a powder when it is sticky.

The concave bar B is below the elastic roller and may be made of any metal that can be hardened and polished smooth, the polished surface fitting the curvature of the elastic roller A, and its hard and smooth surface reducing the friction. The concave bar B is held in place relatively to the elastic roller A by means of two adjusting-screws, 7 and F, at each of its ends. The concave B is of such shape that one of its faces lies in a plane which is nearly tangential to the surface of the elastic roller, while its concave portion forms an acute angle with such face, and the reciprocating cleaning-plate E is arranged to move up and down in close proximity to the tangential face of the concave and to the elastic roller, so that the lower edge of the cleaning-plate will pass and repass the line where the barrel of the elastic roller meets the upper sharp edge of the concave. The most convenient way of obtaining the reciprocating movement of the cleaning-plate is to connect its opposite ends by rods with a pair of cranks secured to the same revolving shaft, so that as the shaft revolves the lower toothed edge of the cleaning-plate is caused to move up and down equally from end to end and past the bite of the elastic roller A and concave B. The stroke of the cleaning-plate may be six-eighths of an inch, more or less. About three-eighths of it is above the edge of the concave, and the remainder below that edge. The lower edge of the cleaning-plate E is formed into a row of teeth by grooving or fluting out the face of the plate which is nearest the elastic roller into a continuous series of parallel grooves, arranged perpendicularly to its lower edge and by beveling off the lower outer edge, as shown at *a*. In order to afford a freer passage to the fiber, the ribs so formed by grooving the plate may be partially removed by hollowing out a part of the surface of them nearest the elastic roller, as shown at *l* in Fig. 5, to give more room above the points for the fiber as it passes through between them. The cleaning-plate is maintained in its position in front of the concave by its guides K, secured to each end of the gin in proper positions to receive the projections at each end of the cleaning-plate E; and in place of connecting the cleaning-plate E directly with the cranks of a revolving shaft, it may be connected with the cranks G through the intervention of toggle-jointed links H by rods N, so as to obtain two complete reciprocations of the cleaner for one revolution of the cranks.

In order to feed the machine conveniently, an inclined feed-board, J, should be placed before the concave and the elastic roller. The inner edge of the feed-board is fitted with teeth, which project near the face of the concave and form a grating, which prevents the passage of the fiber, but permits the seeds and other coarse substances to drop through when they are ejected by the teeth and edge of the reciprocating cleaning-plate E, the teeth of the cleaning-plate striking through the fiber behind the seeds as they are ejected.

In order that the machine may embody the second part of my invention, it is provided with two additional rollers, one roller, 8, of which is arranged behind the concave bar B, the other, 5, beneath it. An endless apron is then placed over these rollers and over the concave bar, and the rollers are caused to revolve by gearing, or by the friction produced by the pressure of the belt on the roller 8 against the elastic roller A, so that the belt or apron will travel by friction up the tangential face of the concave, and between it and the elastic roller A with about the same speed of surface as the surface-speed of the elastic roller. In order to hold the apron in its proper position, it is provided with corded edges, each of which is acted upon by two guide-wheels, D, one at each side of the belt, said guide-wheels being sustained by brackets projecting from the frame of the machine. The roller 5 is a tightening-roller, adjusting-screws I being provided for the purpose of adjusting the positions of its boxes. This gin is to be used with or without said apron, as the case may require.

The dimensions of the elastic roller before mentioned are suitable for a hand-gin. In such gins the surface of the concave which fits the elastic roller may be formed one-half of an inch to one inch and a half in breadth, as the case may require. In machines to be driven by other power the elastic roller and other parts may be increased in size, as deemed expedient.

In the operation of the machine the fibers are seized by the moving surface of the elastic roller A against the concave B, and are drawn in between them, while the teeth of the cleaning-plate E pass down through the fibers behind the seeds, and eject them as fast as the fibers are drawn in. As the cleaning-plate rises, the fiber, which is drawn along continuously by the operation of the elastic roller against the concave, follows the rising points of the teeth of the cleaning-plate; hence the speed of the cleaning-plate should be sufficiently faster than that of the surface of the elastic roller to enable its teeth to rise to their highest positions and redescend as far as the edge of the concave B by the time that part of the fiber upon which the cleaning-plate last acted is drawn up just past the edge of the concave. A faster speed than this is not necessary, and requires a greater expenditure of power.

What I claim as my invention, and desire to secure by Letters Patent, is—

1. The combination of the elastic roller A with the concave bar B, connected and operating together substantially as described.

2. The combination of the elastic roller A, the concave bar B, and the endless apron C, arranged and operating together substantially as described.

3. The combination and arrangement of the elastic roller A, the concave bar B, and the cleaning-plate E, constructed and operating together substantially as described.

4. The cleaning-plate E, constructed with grooves in its inner side, and operating in combination with devices for drawing the fiber through said grooves, substantially as described.

5. The cleaning-plate E, constructed with teeth formed by grooving its inner side and beveling its lower edge, and operating in connection with devices for drawing the fiber between said teeth, substantially as described.

In testimony whereof I have hereto subscribed my name.

ENOCH OSGOOD.

Witnesses:
JAS. S. WIGHTMAN,
W. L. BENNEM.